US007565214B2

(12) United States Patent
Niiyama et al.

(10) Patent No.: US 7,565,214 B2
(45) Date of Patent: Jul. 21, 2009

(54) AUDIO SYSTEM FOR PLAYING BACK RECORDED INFORMATION BY REMOTE TRANSMISSION

(75) Inventors: Tetsuya Niiyama, Shinagawa (JP); Keiji Miyatsu, Shinagawa (JP); Toshimasa Sato, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 613 days.

(21) Appl. No.: 11/186,797

(22) Filed: Jul. 22, 2005

(65) Prior Publication Data

US 2006/0168641 A1 Jul. 27, 2006

(30) Foreign Application Priority Data

Dec. 9, 2004 (JP) ............................. 2004-356666

(51) Int. Cl.
*G06F 17/00* (2006.01)
*H04B 1/00* (2006.01)

(52) U.S. Cl. ........................................ 700/94; 381/119

(58) Field of Classification Search .................. 700/94; 375/141, 130; 704/200.1; 369/4; 381/21, 381/107, 119

See application file for complete search history.

(56) References Cited

U.S. PATENT DOCUMENTS

| | | | | |
|---|---|---|---|---|
| 4,442,540 | A * | 4/1984 | Allen | 370/484 |
| 6,466,832 | B1 * | 10/2002 | Zuqert et al. | 700/94 |
| 6,975,746 | B2 * | 12/2005 | Davis et al. | 382/100 |
| 2003/0021241 | A1 * | 1/2003 | Dame et al. | 370/321 |

FOREIGN PATENT DOCUMENTS

| | | |
|---|---|---|
| JP | 4-307470 | 10/1992 |
| JP | 8-96512 | 4/1996 |

* cited by examiner

*Primary Examiner*—Curtis Kuntz
*Assistant Examiner*—Andrew C Flanders
(74) *Attorney, Agent, or Firm*—Staas & Halsey LLP

(57) ABSTRACT

The present invention is directed to an audio system for playing back recorded information by remote transmission. At the transmitting end of the system, an analog audio signal acquired by a server from a recording medium is first converted into a digital data signal, and then a signal created by superimposing the digital data signal with a stereo signal is transmitted out. At the receiving end, an input circuit receives the superimposed signal transmitted over a cable from the transmitting end, and separates it into the digital data signal and the stereo signal; then, the digital data signal is converted back into the analog audio signal which is output to speakers for stereo playback. As, of the plurality of signals to be transmitted, two signals are combined into one signal for transmission, the number of connecting cables can be reduced.

6 Claims, 5 Drawing Sheets

AUDIO SYSTEM FOR PLAYING BACK RECORDED INFORMATION BY REMOTE TRANSMISSION

CROSS-REFERENCE TO RELATED APPLICATION

This application claims the priorities of Japanese Patent Application Number 2004-356666, filed on Dec. 9, 2004.

BACKGROUND OF THE INVENTION

1. Field of the Invention

The present invention relates to an audio system for playing back recorded information by remote transmission and, more particularly, to an audio system for playing back recorded information by remote transmission wherein an output device such as a speaker installed at a location remote from an audio playback server can be operated using a keyboard, mouse, etc. attached to the server.

2. Description of the Related Art

A variety of audio information playback apparatuses for playing back digital audio signals from a recording medium, such as a magnetic tape, compact disc (CD), or digital versatile disc (DVD), and for reproducing the sound through speakers have been developed in the prior art, as disclosed, for example, in Japanese Unexamined Patent Publication Nos. H04-307470 and H08-96512.

An audio system for playing back sound information recorded on CDs can be taken as a representative example of the prior art audio playback apparatus. In this CD audio playback system, an audio playback server, a digital/analog (DA) conversion circuit, and speakers are connected. The audio playback server includes a CD audio playback processor IC, and outputs digital data, i.e., the audio signal read from the CD, along with an L/R channel discriminating stereo (R/L) signal associated with the audio signal and a clock signal for determining the input/output timing of the digital data.

The audio signal, the stereo signal, and the clock signal output from the audio playback server are input to the digital/analog (DA) conversion circuit. Here, the audio signal is converted into a stereo analog signal in accordance with the stereo signal and the clock signal, and is output to the speakers which reproduce the audio signal as sound.

In the above CD audio playback system, generally, the CD audio playback processor IC and the DA conversion circuit are integrated into a single package to reduce the cost. However, there are cases where output devices such as the speakers have to be installed at a location far away from the CD audio playback server; in such cases, the CD audio playback server is connected to the output devices via a local area network (LAN).

In the thus configured CD audio playback system, when such problems as S/N ratio and signal attenuation are considered, it would not be advantageous to transmit the analog output signal to the speakers by connecting the DA conversion circuit to the speakers over a long cable. One possible solution to this problem is to install the DA conversion circuit and the speakers separately from the audio playback server and to connect between the DA conversion circuit and the audio playback server by a long cable along which the signal can be transmitted in digital data form.

In that case, as the audio signal as the audio digital data, the stereo signal as the L/R digital data, and the clock signal as the system clock are each transmitted using a twisted-pair cable consisting of a pair of conductors, three twisted-pair cables (a total of six conductors) must be installed. If a bit clock is to be transmitted separately from the system clock, one more twisted-pair cable has to be added as a cable for transmitting the bit clock.

In this way, when transmitting digital data to the DA conversion circuit and the speakers located remotely from the audio playback server, at least three twisted-pair cables have to be installed. As a result, as the distance from the audio playback server to the speakers as the output devices increases, the cables connecting between them become longer, and hence there arises the problem that the cost increases.

SUMMARY OF THE INVENTION

In view of the above problem, it is an object of the present invention to provide a remote transmission audio playback system that permits the number of cables used to be reduced by transmitting the audio signal, stereo signal, and clock signal from the audio playback server to the output devices by combining two of these signals into one signal.

According to the present invention, an audio system for playing back recorded information by remote transmission comprises: a transmitting output circuit containing an analog/digital converter for converting an analog audio signal, representing the recorded information acquired by an audio playback server, into a digital data signal, and a superimposing circuit for creating a first superimposed signal from the digital data signal and a stereo signal; and a receiving input circuit containing a separating circuit for separating the first superimposed signal, transmitted over a first cable from the transmitting output circuit, into the digital data signal and the stereo signal, and a digital/analog conversion circuit for converting the separated digital data signal into analog form, wherein the receiving input circuit outputs the analog audio signal to an audio output device for playback.

The superimposing circuit creates a second superimposed signal from a system clock signal and a bit clock signal to be used for playback, and the separating circuit separates the second superimposed signal, transmitted over a second cable from the transmitting output circuit, into the system clock signal and the bit clock signal.

Further, the system clock signal to be used for playback is transmitted from the transmitting output circuit to the receiving input circuit over the second cable.

The superimposing circuit creates the first superimposed signal by performing an addition or a subtraction between the audio signal and the stereo signal.

The first cable and the second cable are each a twisted-pair cable consisting of a pair of conductors.

As described above, in the audio system for playing back recorded information by remote transmission according to the present invention, the transmitting output circuit and the receiving input circuit are interconnected by cable and, in the transmitting output circuit, the analog audio signal acquired by the audio playback server is converted into a digital data signal, and the superimposed signal is created by superimposing the digital data signal with the stereo signal; on the other hand, in the receiving input circuit, the superimposed signal transmitted over the cable from the transmitting output circuit is separated into the digital data signal and the stereo signal, and the digital data signal is converted back into the analog audio signal which is output to the speakers.

In this way, the audio signal can be transmitted in digital data form to the DA conversion circuit and the speakers installed at a location remote from the audio playback server and, while at least three twisted-pair cables have been required according to the prior art, only two twisted-pair cables can suffice for the purpose according to the present invention, and the number of cables used can thus be reduced. Accordingly, if the speakers as output devices are located farther away from the audio playback server, requiring the use of a longer cable, the cost can be reduced.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DESCRIPTION OF THE PREFERRED EMBODIMENTS

Figure 1:
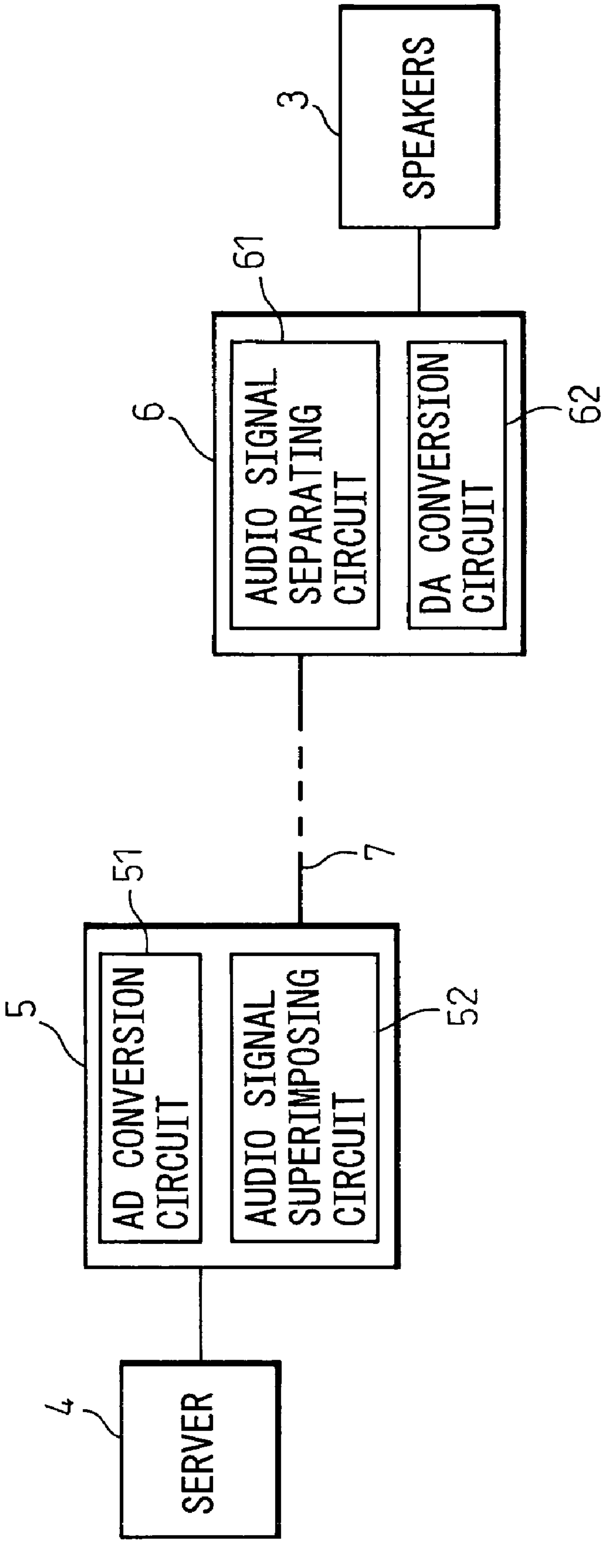
FIG. 1 is a schematic block diagram showing the configuration of an audio system for playing back recorded information by remote transmission according to an embodiment of the present invention.

Before proceeding to the description of an embodiment of the present invention, a traditionally-used conventional audio system for playing back recorded information on CDs, to which the present invention is not applied, will be described in detail with reference to the drawing in order to clarify the effect that the present invention offers.

Figure 6:
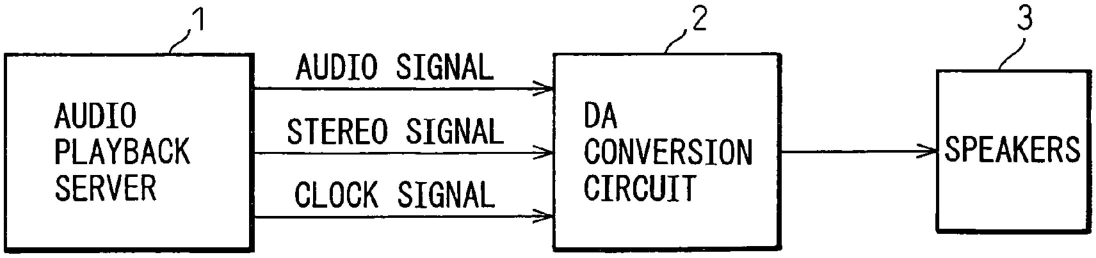
Fig. 6 PRIOR ART
FIG. 6 is a schematic block diagram showing the configuration of an audio system for playing back recorded information according to the prior art.

FIG. 6 is a schematic block diagram showing the configuration of a CD audio playback system as a representative example of the audio playback apparatus to illustrate the conventional audio system. Specifically, FIG. 6 shows a simplified schematic of the prior art CD audio playback system. An audio playback server 1, a digital/analog (DA) conversion circuit 2, and speakers 3 are shown as representative component elements of the CD audio playback system, along with their interconnections.

From the server 1 containing a CD audio playback processor IC, an audio signal carrying the digital data retrieved from the CD, a stereo (R/L) signal associated with the audio signal, and a clock signal for determining the input/output timing of the digital data are output to the DA conversion circuit 2. Here, the audio signal is converted into a stereo analog signal in accordance with the stereo signal and the clock signal, and is output to the speakers 3 which reproduce the audio signal as sound.

In this audio playback system, when output devices such as the speakers 3 are installed at a location far away from the CD audio playback server 1, the output devices are connected to the CD audio playback server 1 via a LAN. In this case, the DA conversion circuit 2 and the speakers 3 are installed at a location remote from the audio playback server 1. The DA conversion circuit 2 and the audio playback server 1 are interconnected by a long cable along which the signals can be transmitted in digital data form.

In this case, in order that the audio signal as the audio digital data, the stereo signal as the L/R digital data, and the clock signal as the system clock can each be transmitted using a twisted-pair cable consisting of a pair of conductors, three twisted-pair cables (a total of six conductors) are installed. If a bit clock is to be transmitted separately from the system clock, one more twisted-pair cable is added as a cable for transmitting the bit clock.

In view of the above, the present invention provides an audio system, for playing back recorded information by remote transmission, that permits the number of cables used to be reduced by transmitting the audio signal, stereo signal, and clock signal from the audio playback server to the output devices by combining two of these signals into one signal.

Next, the embodiment of the audio system for playing back recorded information by remote transmission according to the present invention will be described below with reference to the drawings. FIG. 1 is a schematic block diagram showing the configuration of the audio system for playing back recorded information by remote transmission according to the present embodiment. The audio system comprises an audio playback server 4, a transmitting output circuit 5, a receiving input circuit 6, and speakers 3. The transmitting output circuit 5 is attached to the audio playback server 4, and is connected via an RJ45 connector to the receiving input circuit 6 over a long LAN cable. The receiving input circuit 6 is connected to the speakers 3 as output devices.

The transmitting output circuit 5 includes an AD conversion circuit 51 and an audio signal superimposing circuit 52; the AD conversion circuit 51 receives from the audio playback server 4 an audio signal representing the recorded information retrieved from a CD or the like, and converts the audio signal from analog to digital data form. The audio signal converted into the digital data is fed to the audio signal superimposing circuit 52 where the audio signal is superimposed with the stereo (L/R) signal which is one of the signals to be transmitted to the receiving input circuit 6; the audio signal and the stereo signal are thus combined into one superimposed signal.

Further, in the transmitting output circuit 5, if the system clock signal for DA conversion and the bit clock signal for synchronization are both included in the signals to be transmitted to the receiving input circuit 6, the audio signal superimposing circuit 52 combines the system clock signal and the bit clock signal into one superimposed signal. On the other hand, if the receiving input circuit 6 is configured to generate the bit clock signal based on the system clock signal, the system clock need not be superimposed, and the system clock is transmitted by itself as one signal.

The receiving input circuit 6 includes an audio signal separating circuit 61 and a DA conversion circuit 62, and the superimposed signal received over the cable 7 is separated by the audio signal separating circuit 61 into the original signals. The separated audio signal is then converted by the DA conversion circuit 62 from the digital data to the analog signal in accordance with the received clock signal, and the thus converted audio signal is output to the speakers 3.

Figure 2:
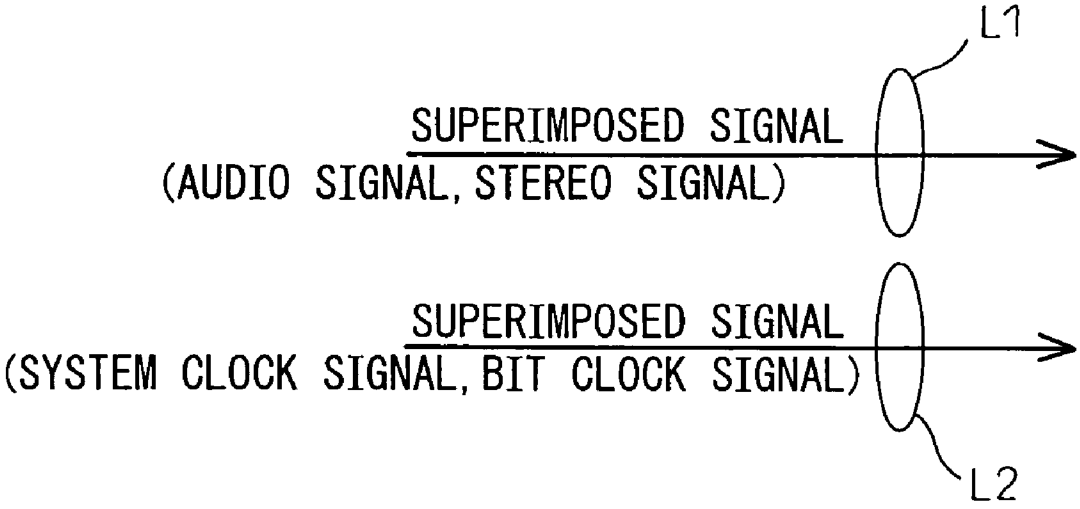
FIG. 2 is a diagram for explaining a method of cable transmission in the audio system for playing back recorded information by remote transmission according to the present invention.

The configuration of the cable 7 connecting between the transmitting output circuit 5 and the receiving input circuit 6 is shown in FIG. 2. In FIG. 1, the cable 7 is shown by a single line the middle portion of which is indicated by a dashed line to imply that the cable is long; however, the cable 7 is actually two twisted-pair cables each consisting of a pair of conductors. In FIG. 2, two twisted-pair cables L1 and L2 are shown as the cable 7.

The twisted-pair cable L1 is used to transmit the superimposed signal of the audio signal and stereo signal from the transmitting output circuit 5 to the receiving input circuit 6; likewise, the twisted-pair cable L2 is used to transmit the superimposed signal of the system clock signal and bit clock signal, or the system clock signal by itself, from the transmitting output circuit 5 to the receiving input circuit 6. In this way, while at least three twisted-pair cables have been required according to the cable transmission method of the prior art, only two twisted-pair cables can suffice for the purpose according to the transmission method of the present embodiment, and thus the number of cables used can be reduced, serving to reduce the cost.

Next, referring to FIGS. 3 and 4, a description will be given of how the superimposition of the signals is performed by the audio signal superimposing circuit 52 in the transmitting output circuit 5. FIGS. 3A to 3D show the waveforms of the audio signal and the stereo signal input to the audio signal superimposing circuit 52 and the waveforms of the superimposed signals. FIGS. 4A and 4B show a specific example of the superimposing circuit.

Figure 3A:
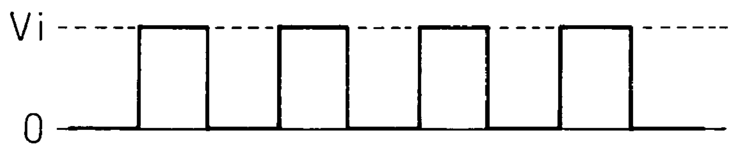
FIGS. 3A to 3D are diagrams showing two signal waveforms for explaining how the signals are superimposed for transmission in the audio system for playing back recorded information by remote transmission according to the present invention.
Figure 3B:
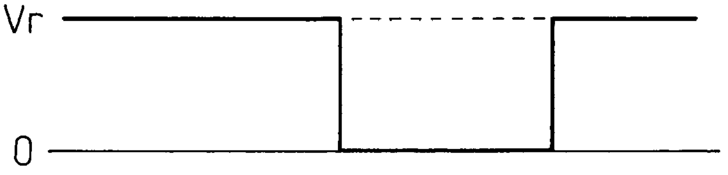
Figure 4A:
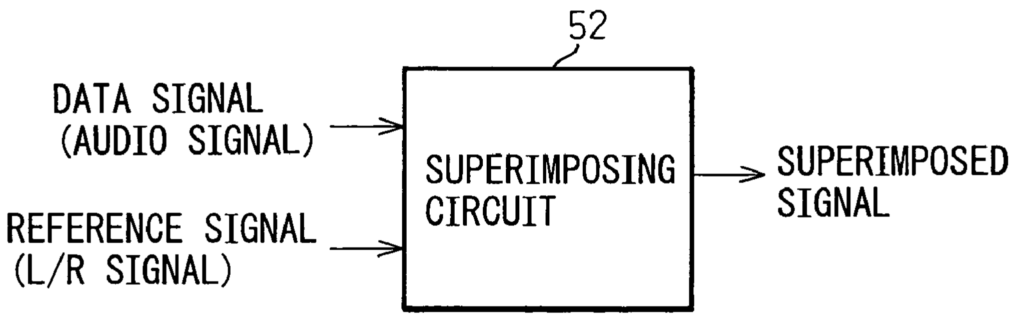
FIGS. 4A and 4B are diagrams for explaining a specific example of a signal superimposing circuit at the transmitting end of the audio system for playing back recorded information by remote transmission according to the present invention.

FIG. 4A shows a simplified schematic of the superimposing circuit. A data signal obtained by digitizing the audio signal by the AD conversion circuit 51 is input to one input terminal of the superimposing circuit 52, while the stereo (L/R) signal is input as a reference signal to the other input terminal. It is assumed here that the audio signal as the data signal is, for example, a digital waveform having a signal level Vi as shown in FIG. 3A. It is also assumed that the L/R signal as the reference signal is a digital waveform having a signal level Vr as shown in FIG. 3B.

Figure 3C:
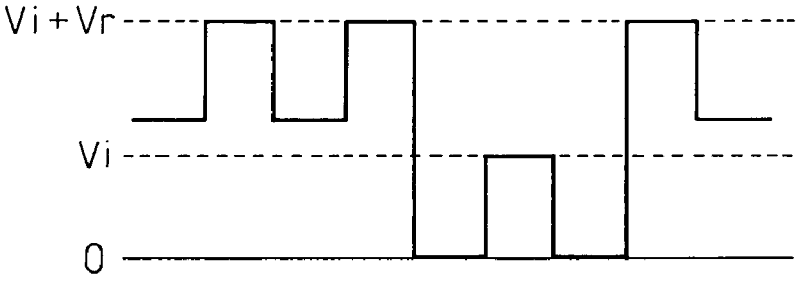
Figure 4B:
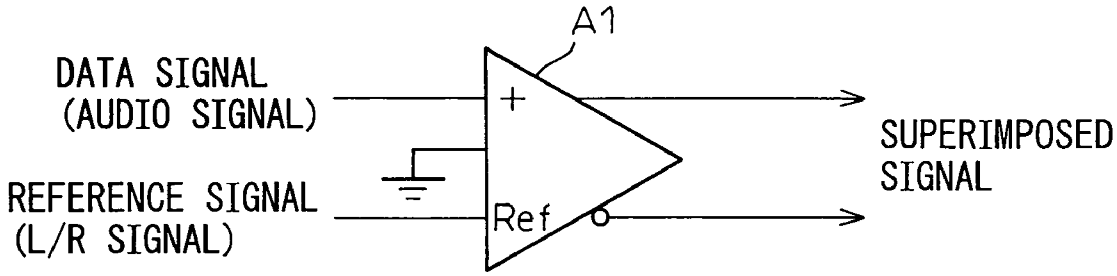

A specific example of the superimposing circuit 52 is shown in FIG. 4B. The superimposing circuit 52 comprises, for example, a differential amplifier A1; here, the data signal is input to the positive input terminal of the differential amplifier A1, and the L/R signal is input to the Ref input terminal as the reference input. When the signals shown in FIGS. 3A and 3B are input to the differential amplifier A1 in this manner, the superimposing circuit 52 performs the superimposition by summing the two signals, and the resulting superimposed signal has the waveform shown in FIG. 3C. When the reference signal is at the signal level Vr, if the data signal is at the signal level Vi, the sum of the two signals has a signal level of Vi+Vr. On the other hand, when the reference signal is at the signal level 0, if the data signal is at the signal level Vi, then the sum of the two signals has a signal level of vi.

In the above superimposing operation, the two input signals have been summed together in the superimposing circuit 52, but instead, the superimposing circuit 52 may be constructed from a differential amplifier that performs a subtraction operation; in that case, the L/R signal is input as the reference signal, and the data signal is input to the negative input terminal, to generate the superimposed signal by subtraction.

Figure 3D:
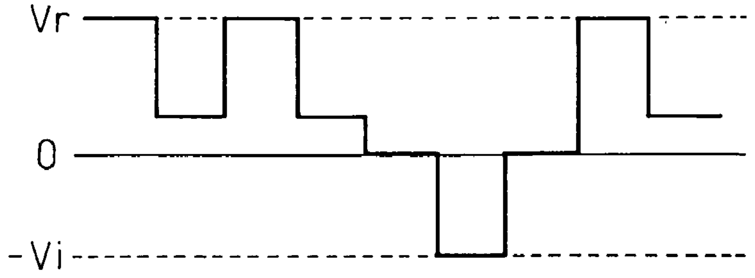

FIG. 3D shows the waveform of the superimposed signal generated by subtracting the data signal shown in FIG. 3A from the L/R signal shown in FIG. 3B. When the reference signal is at the signal level Vr, if the data signal is at the signal level Vi, the latter is subtracted from the former, and the resulting signal has a signal level of Vr-Vi. On the other hand, when the reference signal is at the signal level 0, if the data signal is at the signal level Vi, the latter is subtracted from the former, and the resulting signal has a signal level of −Vi. The waveform of the superimposed signal in this case has pulses appearing on both the positive and negative sides of the signal level 0.

The generation of the superimposed signal by subtraction can also be accomplished if the above input method is reversed, that is, by inputting the data signal as the reference signal and inputting the L/R signal to the negative input terminal. Though not shown here, the superimposed signal in this case is different from the one shown in FIG. 3D. When the L/R signal is at the signal level Vr, if the data signal is at the 0 level, the superimposed signal level is −Vr. On the other hand, when the L/R signal is at the 0 level, if the data signal is also at the 0 level, the superimposed signal level is the 0 level, and if the data signal is at the signal level Vi, the superimposed signal level is Vi.

The above description has been given for the case where the superimposed signal is generated based on the data signal shown in FIG. 3A and the L/R signal shown in FIG. 3B, but it will be appreciated that the generation of the superimposed signal based on the system clock signal and bit clock signal can also be accomplished by a similar superimposing method to that described above.

The above has described how the superimposition of the signals is performed by the audio signal superimposing circuit 52 in the transmitting output circuit 5; next, referring to FIGS. 5A and 5B, a description will be given of how the signals are separated by the audio signal separating circuit 62 in the receiving input circuit 6. Basically, the separating operation of the audio signal separating circuit 62 can be accomplished by reversing the superimposing operation.

Figure 5A:
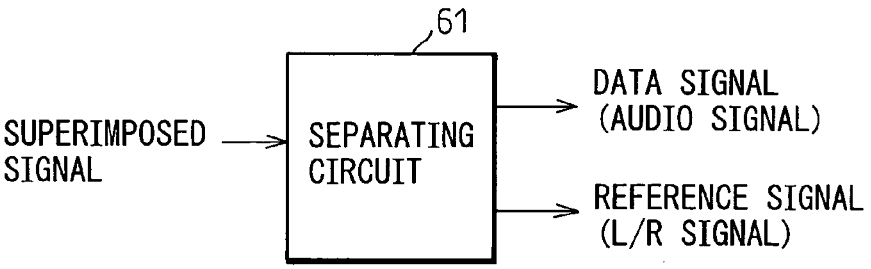
FIGS. 5A and 5B are diagrams for explaining a specific example of a signal separating circuit at the receiving end of the audio system for playing back recorded information by remote transmission according to the present invention.

FIG. 5A shows a simplified schematic of the audio signal separating circuit 61; the superimposed signal transmitted over the cable 7 from the transmitting output circuit 5 is input to the input terminal of the separating circuit 61, where the superimposed signal is separated into the data signal and the L/R signal that serves as the reference signal, and the data signal is supplied to the DA conversion circuit 62 which outputs it as the audio signal to the speakers.

Figure 5B:
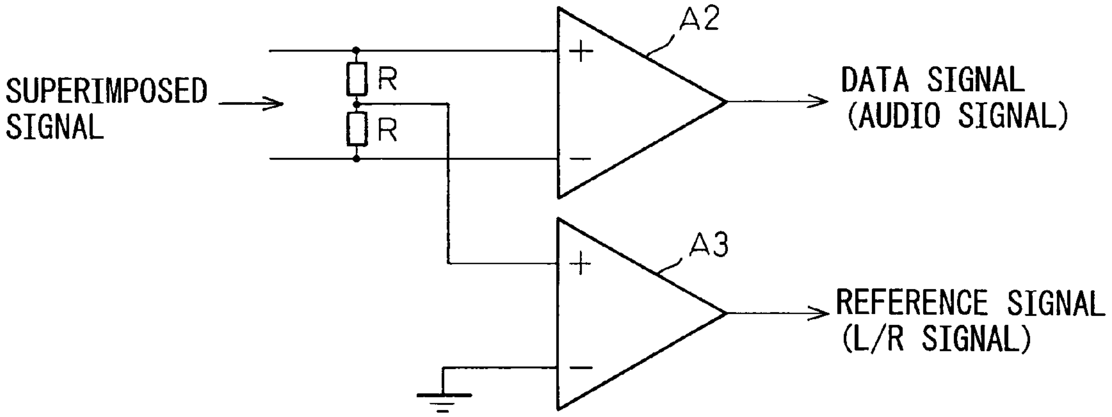

FIG. 5B shows a specific example of the audio signal separating circuit 61. The separating circuit comprises two differential amplifiers A2 and A3. The differential output of the superimposed signal shown in FIG. 3C is transmitted over the cable 7 and input to the positive and negative input terminals of the differential amplifier A2. With this differential amplifier A2, the data signal is separated from the superimposed signal and output.

On the other hand, the midpoint level of the differential output of the superimposed signal, detected by resistors R connected between the positive and negative input terminals of the differential amplifier A2, is input to the positive input terminal of the differential amplifier A3 whose negative input terminal is grounded and thus supplied with the 0 level. With this differential amplifier A3, the L/R signal as the reference signal is separated from the superimposed signal and output.

As described above, the data signal and the L/R signal can be separated from the superimposed signal generated by addition shown in FIG. 3C, but it will also be recognized that, from the superimposed signal generated by subtraction shown in FIG. 3D, the data signal and the L/R signal can likewise be separated using a similar superimposing circuit configuration. In the case of the superimposed signal generated by subtraction, however, the midpoint level of the differential output of the superimposed signal must be input to the negative input terminal of the differential amplifier A3, and the positive input terminal must be grounded and supplied with the 0 level.

As described above, in the audio system for playing back recorded information by remote transmission according to the present embodiment, the audio signal generated by the audio playback server is not transmitted in analog form to the output devices, but is converted into a digital data signal, and this data signal and the stereo signal to be transmitted are combined into one superimposed signal for transmission, or the system clock signal and the bit clock signal are combined into one superimposed signal for transmission; in this way, the number of twisted-pair cables needed for transmission can be reduced.

What is claimed is:

1. An audio system for playing back recorded information by remote transmission, comprising:

a transmitting output unit having an analog/digital converter converting, each of an analog audio signal and an L/R channel discriminating stereo signal, acquired from the recorded information by an audio playback server, into digital signals each having a digital waveform, and a superimposing circuit creating a first superimposed digital signal by performing, selectively, addition or subtraction between the digital signals respectively corresponding to the analog audio signal and the L/R channel discriminating stereo signal; and a receiving input unit, connected by a first cable to the transmitting output unit, having a separating circuit separating the first superimposed digital signal, transmitted over the first cable from the transmitting output unit, into digital signals respectively corresponding to the analog audio signal and the L/R channel discriminating stereo signal, and a digital/analog conversion circuit converting the digital signal corresponding to the analog audio signal into analog form, wherein the receiving input unit outputs an analog audio stereo signal to an audio output device for playback in accordance with the L/R channel discriminating stereo signal.

2. The audio system for playing back recorded information by remote transmission as claimed in claim 1, wherein:

the transmitting output unit is connected to the receiving input unit by a second cable, the superimposing circuit creates a second superimposed digital signal from a system clock signal and a bit clock signal to be used for playback, acquired by the audio playback server, and the separating circuit separates the second superimposed digital signal, transmitted over the second cable from the transmitting output unit, into the system clock signal and the bit clock signal.

3. The audio system for playing back recorded information by remote transmission as claimed in claim 1, wherein the transmitting output unit is connected to the receiving input unit by a second cable, and a system clock signal to be used for playback, acquired by the audio playback server, is transmitted from the transmitting output circuit to the receiving input unit over the second cable.

4. The audio system for playing back recorded information by remote transmission as claimed in claim 2, wherein each of the first cable and the second cable is a twisted-pair cable consisting of a pair of conductors.

5. The audio system for playing back recorded information by remote transmission as claimed in claim 2, wherein the superimposing circuit creates the second superimposed digital signal by performing, selectively, addition or subtraction between the system clock signal and the bit clock signal to be used for playback.

6. The audio system for playing back recorded information by remote transmission as claimed in claim 3, wherein each of the first cable and the second cable is a twisted-pair cable consisting of a pair of conductors.

* * * * *